Nov. 10, 1959
W. J. PLORAN
2,912,608
STATOR UNIT FOR FLYWHEEL MAGNETOS
Filed Nov. 28, 1956
2 Sheets—Sheet 1
FIG. 5
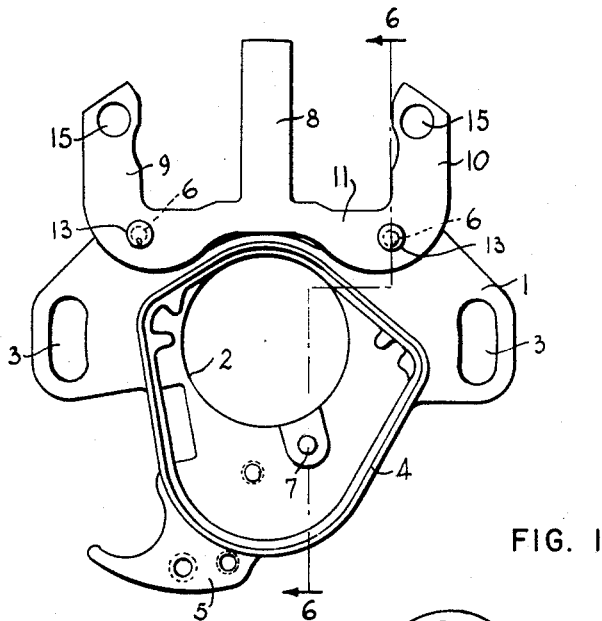
FIG. 6
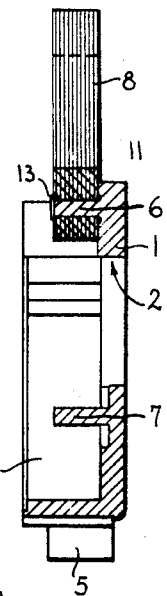
FIG. 1
FIG. 4
FIG. 2
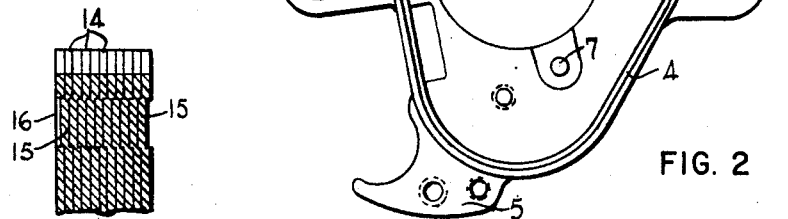
FIG. 3
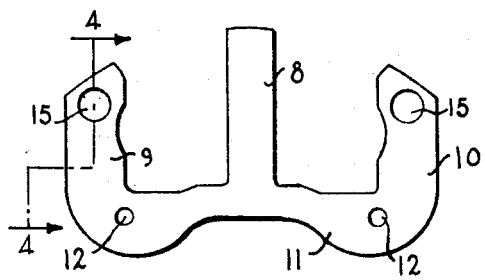
INVENTOR.
WILLIAM J. PLORAN
BY Chapin & Neal
ATTORNEYS Nov. 10, 1959 W. J. PLORAN 2,912,608
STATOR UNIT FOR FLYWHEEL MAGNETOS
Filed Nov. 28, 1956 2 Sheets-Sheet 2
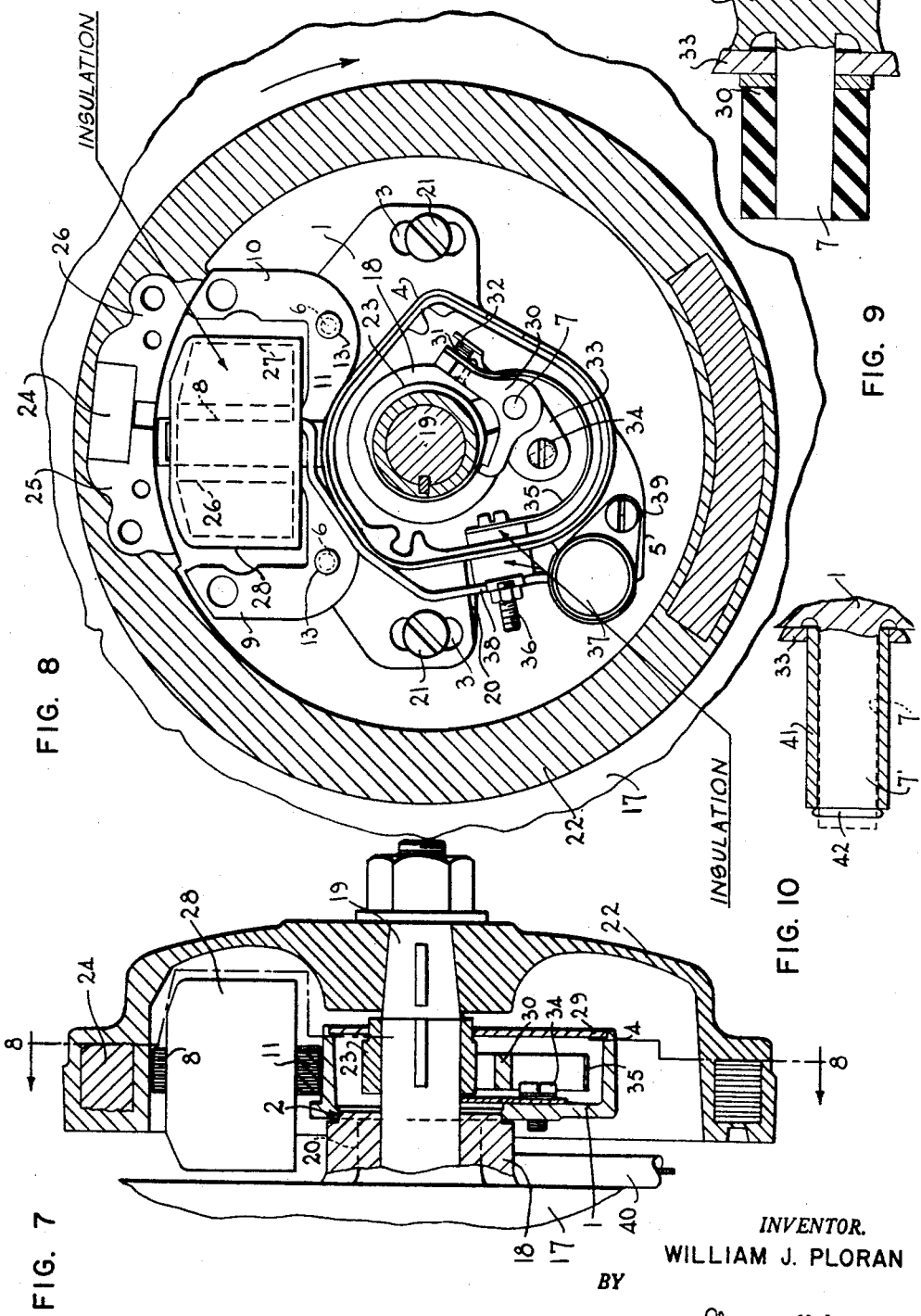
INVENTOR.
WILLIAM J. PLORAN
BY
Chapin & Neal
ATTORNEYS

United States Patent Office 2,912,608
Patented Nov. 10, 1959

2,912,608

STATOR UNIT FOR FLYWHEEL MAGNETOS

William J. Ploran, Willimansett, Mass., assignor to Globe-Union Inc., Milwaukee, Wis., a corporation of Delaware Application November 28, 1956, Serial No. 624,879

1 Claim. (Cl. 310—153)

This invention relates to an improved stator element for a flywheel magneto.

The invention has for its object the provision of such an element, wherein those component parts, which effect the timing of the spark or the output of the magneto and thus the intensity of the ignition spark, are located on the plate with precision by quantity production methods in a manner such that magnetos may be produced with consistent uniformity in timing of the spark and output.

More particularly, the invention has for an object the provision of a die-cast plate of malleable non-magnetic metal having a cylindrical pilot opening to fit the crankshaft hub on the engine crankcase and center it with respect to the crankshaft and the breaker cam fixed thereon, and three pins integral with the plate and located with precision both radially and angularly with respect to the pilot opening, two of said pins supporting the laminated magnetic stator element of the magneto and locating its outer curved surfaces in true coaxial relation with the pilot opening and at the proper radial distance to produce the desired pole gap between such surfaces and the complementarily curved surfaces on the pole shoes of the magnet that is carried by the flywheel of the magneto, the other pin serving to pivotally support the breaker lever and locate it radially and angularly of the pilot opening to cooperate properly with the cam on the engine crankshaft, so that the breaker points will open at precisely the time that the desired edge gap is created between the pole shoes on the flywheel and the said curved surfaces with which it cooperates.

The invention will be disclosed with reference to the illustrative embodiment of it in the accompanying drawings, in which Fig. 1 is a front elevational view of a stator plate embodying the invention;

Fig. 2 is a side elevational view thereof with parts broken away;

Fig. 3 is a front elevational view of the laminated iron stator element;

Fig. 4 is an enlarged cross sectional view taken on the line 4—4 of Fig. 3;

Fig. 5 is a front elevational view of the laminated magnetic stator element assembled on the stator plate;

Fig. 6 is a cross sectional view taken on the line 6—6 of Fig. 5;

Fig. 7 is a sectional elevational view of a flywheel magneto utilizing the invention;

Fig. 8 is a cross sectional view taken on the line 8—8 of Fig. 7;

Fig. 9 is an enlarged sectional view of the breaker arm and its pivot pin having matched drafts; and Fig. 10 is an enlarged sectional view of a bearing sleeve fixed to the breaker pivot pin.

Referring to these drawings; the stator plate is shown separately in Figs. 1 and 2. It consists of a generally flat plate 1 having a cylindrical pilot opening 2 to receive a hub on the engine crankcase through which hub the engine crankshaft passes, and two slots 3 to receive screws for clamping the plate to the crankcase in various positions of angular adjustment. In this particular example, the stator plate also has formed integrally therewith a box 4 to receive the breaker mechanism and outside the box an arm 5 to support a condenser. The important feature of the stator plate is that it has formed integrally therewith two outstanding pins 6, which are utilized to receive the magnetic stator element and locate it with precision in its proper position on the plate, and a pivot pin 7 for the breaker arm. The stator plate 1 and these pins 6 and 7, as well as the other elements described, are die cast as one piece and the relationship between the magnetic stator and the breaker mechanism is fixed. One material that has been found suitable is zinc as this material may be die cast with a minimum of draft on the pins 6 and 7 and it is malleable enough so that the ends of the pins 6 may be headed over like rivets to clamp the magnetic stator to plate 1.

An illustrative example of one magnetic stator is shown in Figs. 3 and 4. It comprises a stack of laminations forming a central core 8, legs 9 and 10, one on each side of the core, and a part 11 integrally connecting the lower ends of the legs and core. The outer end surfaces of the core and of the legs are curved and coaxial with pilot 2. The member 11 has two holes 12 therethrough to receive the described pin 6. The diameter of each hole 12 is exactly equal to the diameter of the inner end of pin 6 which it receives so that the innermost lamination of the magnetic stator element will be located with precision at the proper position on plate 1. Succeeding laminations of the stack are interengaged as will later be described in detail so that their holes 12 will align precisely with the holes in the innermost lamination. After the stator element of Fig. 3 has been mounted on the stator plate of Fig. 1, the outer ends of pins 6 are headed over, as at 13, to clamp the element in place.

The magnetic stator is preferably made up of a precision-stacked group of laminations 14 (Fig. 4). The laminations are formed in a punch press to the shape shown and at the same time the holes 12 are punched therein. Also, the laminations of each stack are held together by indenting a portion of each lamination, as shown at 15, forming a projection on one side and a recess on the other side. As shown, there are eleven laminations. The first or left hand lamination as viewed in Fig. 4 has a hole 16 punched completely therethrough and is thrust into a recess in the punch press, in which recess the laminations are stacked. Each of the ten succeeding laminations will merely have the indented part 15 instead of a hole. As the second lamination is pushed into the described recess in the press the projection on part 15 will be pressed into hole 16. The next nine laminations will successively be thrust into the recess in the punch press and the projection on part 15 of each lamination will be thrust into the correspondingly shaped recess in the preceding lamination. As shown, this construction is applied to each of the legs 9 and 10 of the stator. In this manner, the laminations are stacked in the press and held together as a unit with all the holes 12 in each leg located with precision in exact alignment.

Referring now to Figs. 7 and 8, a portion of the crankcase of an internal combustion engine is shown at 17 together with the hub 18 through which the crankshaft 19 passes and a pad 20. The hub 18 receives and closely fits the pilot opening 2 of the stator plate which is fastened to pad 20 by screws 21 that pass through the curved slots 3 in the plate and enable angular adjustment thereof. The crankshaft 19 has keyed thereto the engine flywheel 22, the rim of which encompasses the stator plate 1. Keyed to the crankshaft is a cam 23 which is located within the breaker box 4 and actuates the breaker mechanism. The flywheel has cast therein a permanent magnet 24 and pole shoes 25 and 26, which are fixed one to each polar end of the magnet and which cooperate with the curved end surfaces of the legs 9 and 10 and the curved end surface of core 8. On the core are primary and secondary coils 26 and 27, contained within an insulating case 28, suitably fixed to the core as indicated. Within the breaker box 4, which is normally closed by a cover 29, shown in Fig. 7, is a breaker lever 30. This lever is made of insulating material and is mounted intermediate its ends on the described pivot pin 7. The lever may be of molded insulation material and the hole that receives pin 7 may have the same draft as pin 7 so that matching drafts result in a precision fit as shown in exaggerated form in Fig. 9. Lever 30 carries a contact 31 which cooperates with a fixed contact 32 to open and close the circuit of the primary coil 26 at properly timed intervals in the rotation of the engine crankshaft. The contact 32 is mounted on a breaker plate 33, which pivots on pin 7 behind the breaker lever 30 (Fig. 9) and may be held to plate 1 in various positions of angular adjustment by a screw 34 (Fig. 8) passing through a slot in the breaker plate. A spring 35 connected at one end to the terminal 36 which is mounted on and insulated from a side wall of breaker box 4 is riveted at its other end to breaker point 31. Spring 35 serves as an electrical conductor, as a means for yieldingly holding the follower on the breaker lever 30 in engagement with the periphery of cam 23 and as a means for holding the breaker lever in axial position on pin 7. One terminal of primary coil 8 is suitably grounded and the other is connected to terminal 36 and to the insulated terminal of a condenser 37 by a conductor 38. The condenser case forms the other terminal of the condenser and is fixed to the described arm 5 by a screw 39. The secondary coil 27 has one of its terminals suitably grounded and the other connected to a spark plug wire shown in part in Fig. 7 at 40.

In Fig. 10, a modification of the breaker arm pivot is shown. Upon the die cast pin 7 is placed a sleeve 41 which may be of brass or any good bearing material. The inside diameter of sleeve 41 is the same as the diameter of the inner end of the die cast pin 7 so that the sleeve will thus be located with precision in exact coaxial relation with the pin. Then, the outer end of pin 7 is headed over the outer end of sleeve 41 as shown at 42 and in this process the pin is upset to fill the sleeve as indicated at 7'. This sleeve is thus fastened in a similar manner to that in which the laminated magnetic stator element is fastened. This arrangement provides a better wearing bearing surface than would the more malleable die cast pin itself.

The operation is the usual one. Assuming clockwise rotation of the cam 23 and flywheel 22, the parts as shown in Fig. 8 are almost in position for producing a spark. The trailing edge of pole shoe 25 has moved away from the forward edge of leg 9 to create the desired edge gap in the magnetic circuit and the trailing edge of pole shoe 26 has moved away from the forward edge of core 8 to create the desired edge gap and break the magnetic circuit that shortly before existed from the magnet 24 through shoe 25 and leg 9, core 8 and shoe 26. At the same time another magnetic circuit has been established through core 8 in a reverse direction, as follows, from the magnet through shoe 25, core 8, leg 10 and shoe 26. The breaker points 31 are about to separate and open the circuit to the primary coil 26, enabling a rapid and substantial change of flux through the core to produce in the secondary coil the voltage necessary for the ignition spark.

The present invention is particularly directed to the location on the stator plate of (1) the magnetic stator element, (2) the stator pilot and (3) the breaker-lever pivot with improved accuracy so that the desired timing of the engine spark may be consistently maintained without variation. The result is obtained by making the pilot, the rivets for the magnetic stator and the pivot pin integral with the stator plate and by the process of die casting the parts to secure the very close tolerances resulting from such process. In forming the described parts with the use of jigs and drills, the accuracy is impaired by wear of the tools and the uniform close tolerances cannot always be had. As these tolerances vary, so does the timing of the spark. The present construction insures that the curved outer faces of the core and legs of the magnetic stator are truly coaxial with the pilot 2 and at the proper radial position to secure the desired air gap or pole gap between these surfaces and the curved surfaces of the pole shoes. It is not necessary to grind or otherwise finish the curved outer surfaces of the legs 9 and 10 and the outer surface of core 8. Also, these curved surfaces are located in the proper angular positions to effect in cooperation with the pole shoes, the desired edge gaps between these parts at the time of separation of the breaker points. The breaker lever pivot 7 is also located at the proper radial distance from the center of the pilot to cooperate with cam 23 and it is also located at the proper angular position with respect to the cam and with respect to the outer curved faces of legs 9 and 10 and core 8 to effect opening of the breaker points at the instant the magnetic rotor has reached the desired position for production of the ignition spark. Under mass production of the magnetos, the timing of the spark is made consistently uniform by the accuracy of the location of the breaker lever with respect to cam 23 and intensity of the spark is maintained consistently uniform by the accuracy of locating the magnetic stator to control the pole gap and edge gaps between such stator and the pole shoes of the magnetic rotor.

What is claimed is:

A stator for a flywheel magneto comprising a die-cast plate of malleable non-magnetic metal having a circularly disposed cylindrical pilot opening adapted to fit over the hub of the crankshaft of an internal combustion engine, an integrally cast pivot pin projecting outwardly from said plate and perpendicular to the outer surface thereof, a bearing sleeve snugly telescoped over said pivot pin with the outer end of said pivot pin being headed over to hold the bearing sleeve in place, the inner end of said pivot pin extending beneath the surface of said plate to the base of a recess surrounding said pin, a breaker lever pivotably mounted on said bushing and located both radially and angularly in predetermined relation with respect to said pilot opening for cooperation with a cam on said crankshaft, said lever having an electrical contact on one end and movable therewith, a breaker plate having a fixed contact cooperating with said movable contact, said breaker plate being interposed between said breaker lever and said stator plate and pivotably mounted on said bushing, and means for securing said breaker plate in adjusted angular position relative to said pivot pin, a pair of integrally cast pins projecting outwardly from said stator plate and perpendicular to the surface thereof, said integral pins being in fixed predetermined relation radially and angularly with respect to said pilot opening and said pivot pin, a laminated magnetic stator composed of a precision-stacked group of laminations having a pair of holes precisely aligned with corresponding holes of other laminations, said holes being of the same diameter as the inner ends of said pair of pins and received thereby, with said pins being headed over to hold said stator in place on said plate, said stator further comprising a core with legs on either side thereof, the outer ends of said core and legs being concentrically formed relative to said pilot opening.

References Cited in the file of this patent

UNITED STATES PATENTS

| | | |
|---|---|---|
| 1,305,165 | Ratcliff | May 27, 1919 |
| 2,073,348 | Merkle | Mar. 9, 1937 |
| 2,427,573 | Phelon | Sept. 16, 1947 |
| 2,470,467 | Brownlee | May 17, 1949 |